United States Patent [19]

Iwasaki

[11] Patent Number: 6,108,679
[45] Date of Patent: Aug. 22, 2000

[54] DISCONTINUOUS SIGNAL INTERPOLATION CIRCUIT

[75] Inventor: Motoya Iwasaki, Tokyo, Japan

[73] Assignee: NEC Corporation, Tokyo, Japan

[21] Appl. No.: 09/129,614

[22] Filed: Aug. 5, 1998

[30] Foreign Application Priority Data

Aug. 6, 1997 [JP] Japan .................................. 9-212143

[51] Int. Cl.$^7$ .................................................. G06F 17/17
[52] U.S. Cl. .......................................... 708/290; 708/313
[58] Field of Search ..................... 708/290, 313; 318/573

[56] References Cited

U.S. PATENT DOCUMENTS

| | | | |
|---|---|---|---|
| 5,434,489 | 7/1995 | Cheng et al. | 318/573 |
| 5,734,688 | 3/1998 | Teraguchi et al. | 708/290 |
| 6,031,885 | 2/2000 | Ishimoto et al. | 708/313 |

*Primary Examiner*—David H. Malzahn
*Attorney, Agent, or Firm*—Ostrolenk, Faber, Gerb & Soffen, LLP

[57] ABSTRACT

An input phase signal having a presentation range from 0 radian to a value smaller than $2\pi$ radian is input to a least significant side shift register 1-1 and to a discontinuity detector 3. The discontinuity detector 3 compares the input phase signal with the same signal delayed by a time corresponding to 1 sample clock in the shift register 1-1, detects a phase discontinuity and outputs $2\pi$ radian when the phase transition is $0 \rightarrow 2\pi$, $-2\pi$ radian when the phase transition is $2\pi \rightarrow 0$ and 0 radian when there is no discontinuity detected. The output of the discontinuity detector 3 is added to outputs of the respective most significant side shift registers 4-1 to 4-n by adders 5-1 to 5-n, respectively. An interpolation circuit 2 performs an interpolation by adding the outputs of the least significant side shift registers 1-1 to 1-n to outputs of the adders 5-1 to 5-n.

4 Claims, 7 Drawing Sheets

DISCONTINUOUS SIGNAL INTERPOLATION CIRCUIT

BACKGROUND OF THE INVENTION

The present invention claims priority from Japanese Patent Application No. 9-12143 filed Aug. 6, 1997, which is incorporated herein by reference.

1. Field of the Invention

The present invention relates to a signal interpolation circuit and, particularly, to a signal interpolation circuit for interpolating a signal such as a phase signal which has a discontinuous point.

2. Description of Related Art

A prior art signal interpolation circuit is usually constructed with shift register stages 1-1, 1-2, ..., 1-n and an interpolation circuit 2, as shown in FIG. 1, where n is a positive integer larger than 1. In such construction of the signal interpolation circuit, a train of sampled signals are input to the shift register stages 1-1 to 1-n. The number (n) of the shift register stages depends upon the interpolation system employed. Outputs of the shift register stages 1-1 to 1-n are input to the interpolation circuit 2 and interpolated therein.

Assuming that the input signal is a phase information of a signal moving on a two dimensional plane as shown in FIG. 2a, a presentation range of the input signal is usually limited within a range from 0 radian to $2\pi$ radian. In such case, the phase of the input signal changes discontinuously between 0 radian and $2\pi$ radian as shown in FIG. 2b even when the input signal is continuously changing practically. In FIGS. 2a and 2b, the sampled input signals are represented by black circles. In such case, when the conventional interpolation method is used, it is impossible to correctly interpolate the input signal as shown by a cross mark in FIG. 2b.

It may be possible to avoid this problem by enlarging the presentation range of the phase signal. In such case, however, it is necessary, when the length of the input signal is large, to enlarge the presentation range correspondingly, causing the circuit size to be increased. Further, when the length of the input signal is not definite, this method can not be applied.

SUMMARY OF THE INVENTION

An object of the present invention is to provide a discontinuous signal interpolation circuit capable of correctly interpolating an input signal even in a case where the input signal has discontinuous points, for example, when a phase thereof transits between 0 radian and $2\pi$ radian as a phase signal.

A discontinuous signal interpolation circuit according to the present invention is featured by comprising a plurality (n) of first register stages input with an input signal having a definite presentation range, for storing a portion of the input signal corresponding to n clocks, where n is an integer larger than 1, a discontinuity detector input with the input signal and an output of a first shift register stage of the n first shift register stages for detecting a discontinuity between the input signal and the output of the first shift register stage of the n first shift register stages and generating a signal indicative of "positive" when the discontinuity is in a direction from a minimum value to a maximum value of the presentation range and a signal indicative of "negative" when the discontinuity is in a direction from the maximum value to the minimum value, a plurality (n) of second shift register stages input with 0 radian, a plurality (n) of adders having input terminals connected to outputs of the first to the n-th second shift register stages, respectively, output terminals of the first to the (n-1)th adders being connected to inputs of the second to the n-th second shift register stages, respectively, and each of the first to the n-th adders being adapted to add a difference between the maximum value and the minimum values of the presentation range of the input signal to the outputs of the n second shift register stages when an output of the discontinuity detector is a signal indicative of "positive", for subtracting the difference between the maximum value and the minimum values of the presentation range from the outputs of the n second shift register stages when an output of the discontinuity detector is a signal indicative of "negative", and supplying a result of the arithmetic operations to the second to the n-th second shift registers, respectively, and an interpolation circuit for adding an output of the k-th first shift register and an output of the k-th adder and interpolating resultant n signals, where k=1, 2, ..., n.

A phase signal having presentation range from 0 radian to $2\pi$ radian is assumed as an example of the input discontinuity signal. In such case, a transition of the phase signal between 0 radian and $2\pi$ radian is detected and the following processing is performed dependent on a direction of the transition:

1) when 0 radian→$2\pi$ radian, $2\pi$ radian is added to the signal stored in the shift register, 2) when $2\pi$ radian→0 radian, $2\pi$ radian is subtracted from the signal stored in the shift register.

That is, the old data stored in each of the first shift register stages is shifted by $2\pi$ radian at the time when the phase discontinuity is detected. Therefore, the phase continuity of the data used for interpolation is maintained, resulting in a correct result of interpolation.

A reference for detecting the transitions from 0 radian to $2\pi$ radian and from $2\pi$ radian to 0 radian may be determined as follow:

1) 0 radian→$2\pi$ radian: discontinuity is detected when phase $\theta$ transits in a manner
$0 \leq \theta < \pi \rightarrow 3\pi/2 \leq \theta < 2\pi$.

2) $2\pi$ radian→0 radian: discontinuity is detected when phase $\theta$ transits in a manner
$\pi \leq \theta < 2\pi \rightarrow 0 \leq \theta < \pi/2$.

In the above case, it is necessary to enlarge the phase presentation range from $-\pi$ radian to $3\pi$ radian.

BRIEF DESCRIPTION OF THE DRAWINGS

The above mentioned and other objects features and advantages of the present invention will become more apparent by reference to the following detailed description of the invention in conjunction with the accompanying drawings, in which.

DETAILED DESCRIPTION OF THE PREFERRED EMBODIMENTS

Figure 3:
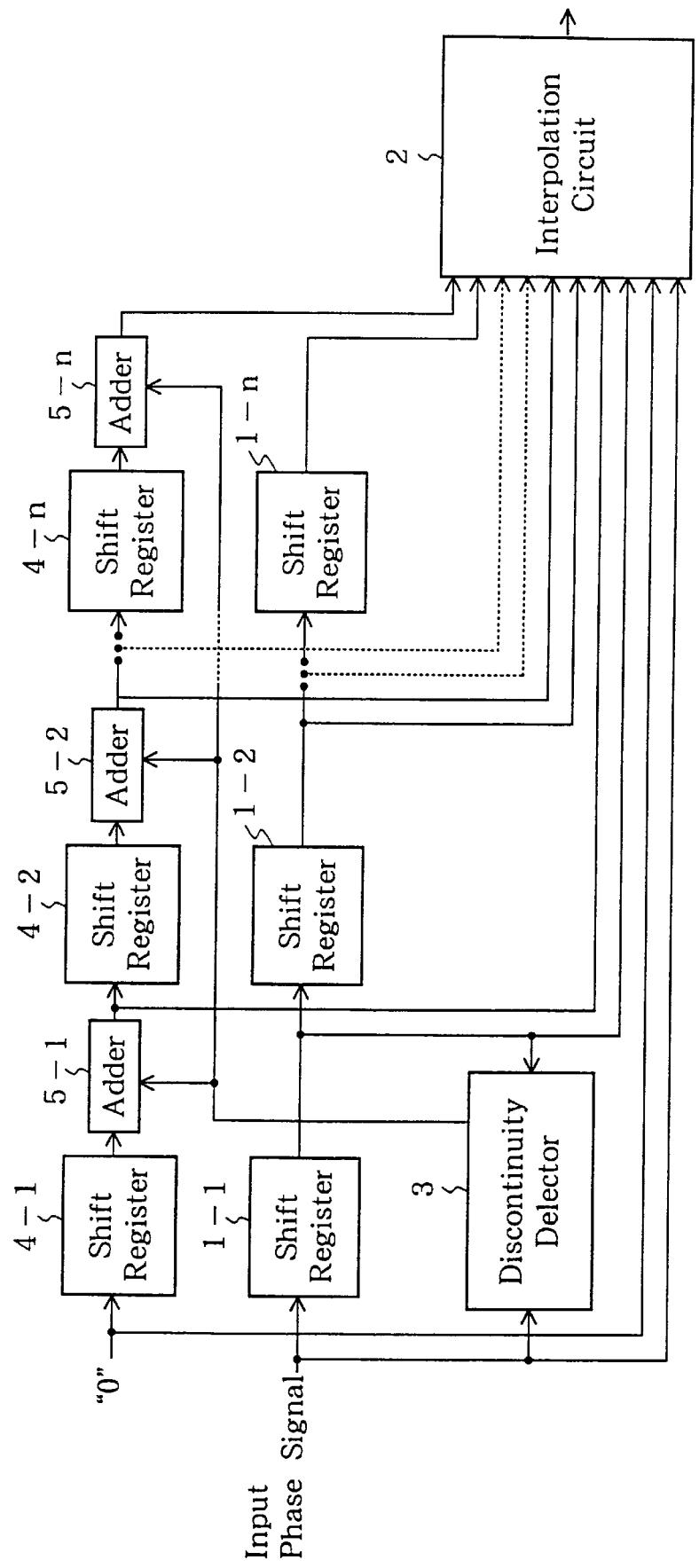
FIG. 3 is a block diagram of a discontinuous signal interpolation circuit according to an embodiment of the present invention.

Referring to FIG. 3, a discontinuity signal interpolation circuit according to an embodiment of the present invention is constructed with least significant side shift registers 1-1, 1-2, ..., 1-n, an interpolation circuit 2, a discontinuity detector 3, most significant side shift registers 4-1, 4-2, ..., 4-n and adders 5-1, 5-2, ..., 5-n, where n is an integer larger than 1.

An input phase signal which is assumed to have a presentation range from 0 radian to a value smaller than $2\pi$ radian is input to the least significant side shift register 1-1, the interpolation circuit 2 and to the discontinuity detector 3. The discontinuity detector 3 detects a phase discontinuity of the input phase signal by comparing the input phase signal with a signal which is obtained by delaying the phase signal by an amount corresponding to one sample clock by the least significant side shift register 1-1 and outputs $2\pi$ radian when the phase transition is $0 \rightarrow 2\pi$ and $-2\pi$ radian when the transition is $2\pi \rightarrow 0$. When there is no phase discontinuity detected, the discontinuity detector 3 outputs 0 radian. The output of the discontinuity detector 3 is input to the adders 5-1 to 5-n in which the output of the discontinuity detector 3 is added to outputs of the most significant side shift registers 4-1 to 4-n having input terminals supplied with "0 radian", respectively. It is enough for the most significant side shift registers 4-1 to 4-n to present $=2\pi$ radian and 0 radian and they are used to present most significant bits of the least significant side shift registers 1-1 to 1-n. The interpolation circuit 2 is input with outputs of the adders 5-1 to 5-n as most significant bits of the outputs of the least significant side shift registers 1-1 to 1-n for interpolation operation.

Figure 1:
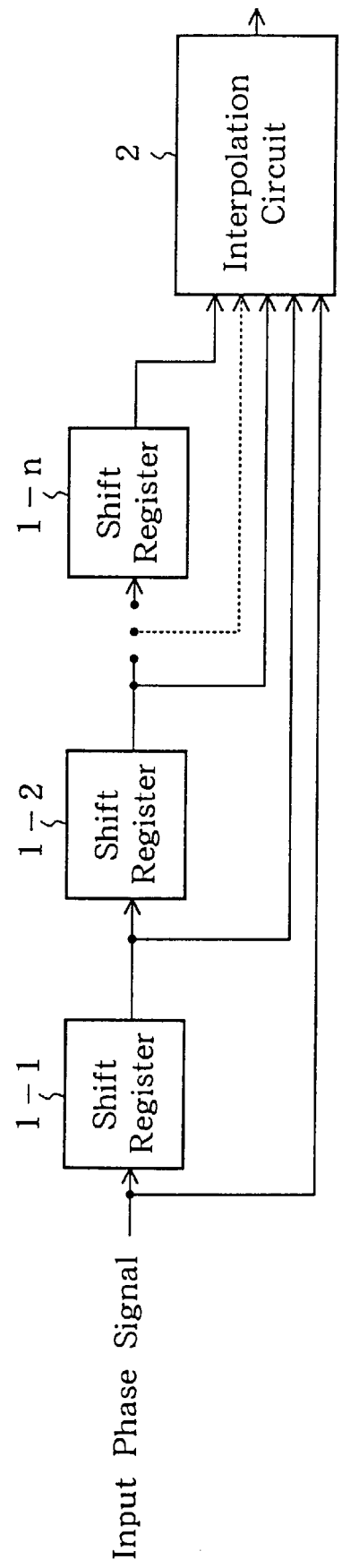
FIG. 1 is a circuit diagram showing an example of a conventional discontinuous signal interpolation circuit.
Figure 2A:
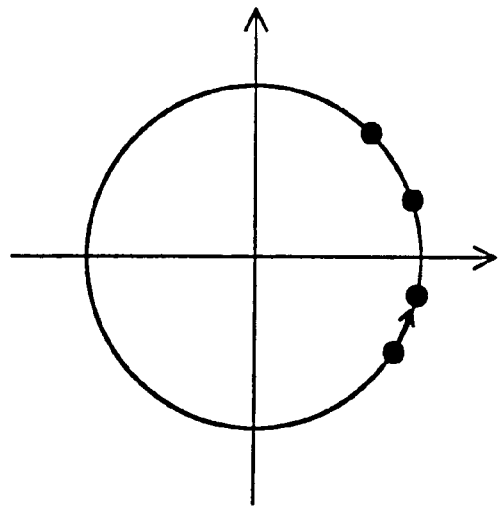
FIGS. 2a and 2b are diagrams for explaining an operation of the discontinuous signal interpolation circuit shown in FIG. 1.
Figure 2B:
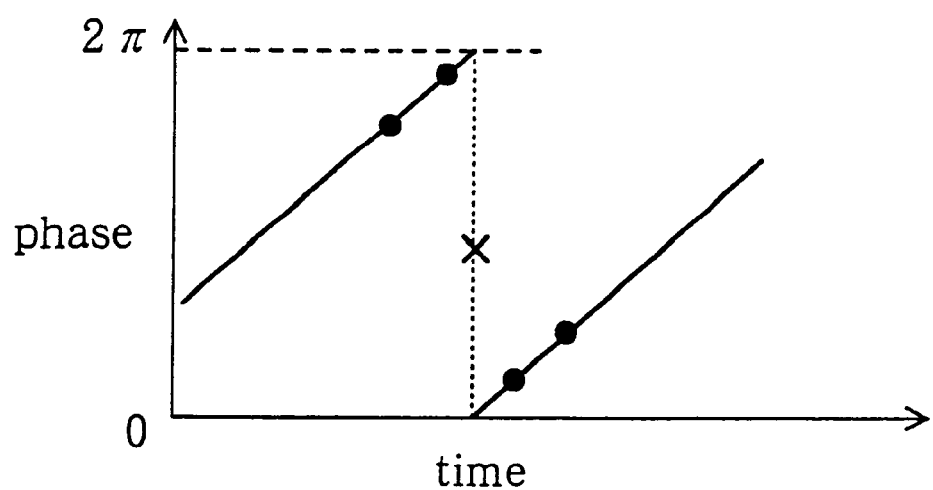
Figure 4A:
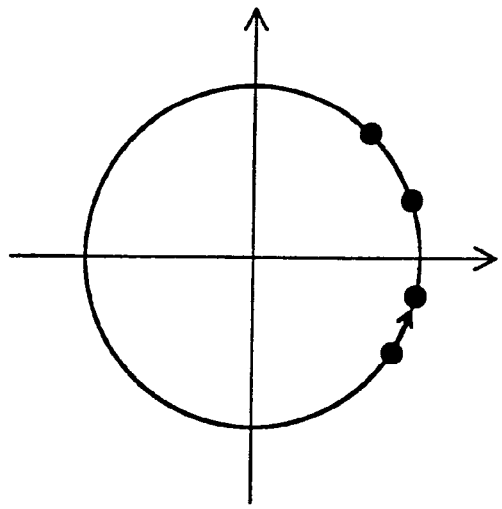
FIG. 4 is a diagram explaining an operation principle of the circuit shown in FIG. 3.
Figure 4B:
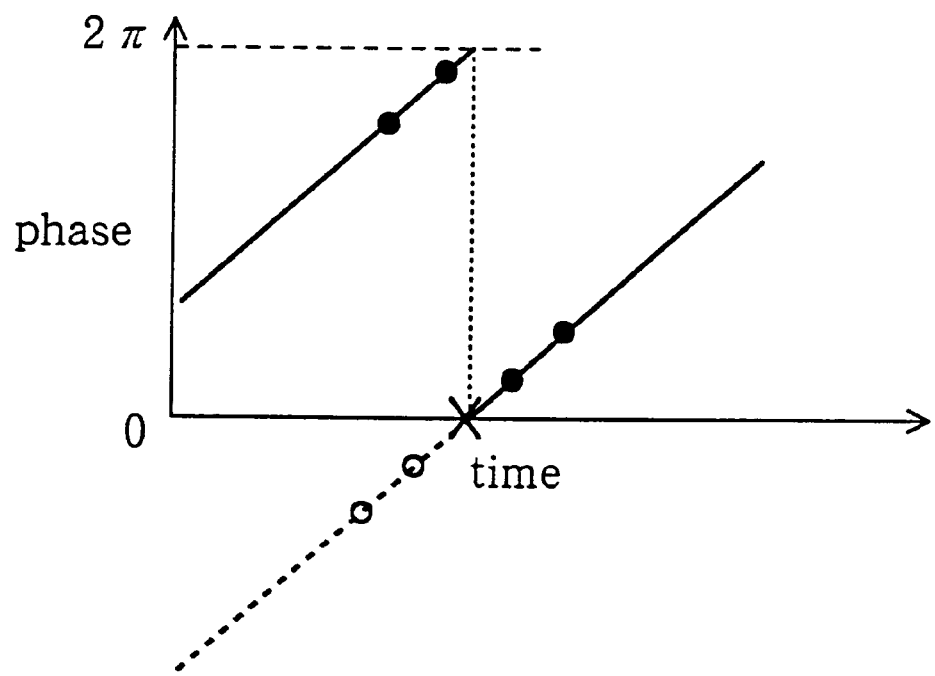

FIGS. 4a and 4b are diagrams explaining the operational principle of this embodiment of the present invention and show the signal position in a signal space and a variation of phase signal with time, respectively, as in FIGS. 2a and 2b. Since data stored in the least significant side shift register stages before a phase discontinuity is detected is shifted by $2\pi$ radian, the phase continuity of data to be used for interpolation is maintained and, therefore, it is possible to obtain a correct interpolation.

The operation of this embodiment will be described in more detail with reference to FIGS. 5a to 5d. In these figures, input values of the least significant side shift registers 1-1 to 1-n at time instances T1, T2, T3 and T4 in the sequence of operation clock are shown. Black circles in these figures represent actual input values and, in this example, the phase discontinuity occurred in between the time instances T2 and T3. Although there are various references in judging this phase discontinuity, the following method is considered:

1) 0 radian$\rightarrow 2\pi$ radian: phase discontinuity is detected when phase $\theta$ transits in a manner
$0 \leq \theta < \pi \rightarrow 3\pi/2 \leq \theta < 2\pi$.

2) $2\pi$ radian$\rightarrow 0$ radian: phase discontinuity is detected when phase $\theta$ transits in a manner
$\pi \leq \theta < 2\pi \rightarrow 0 \leq \theta < \pi/2$.

Figures 5A, 5B, 5C, 5D:
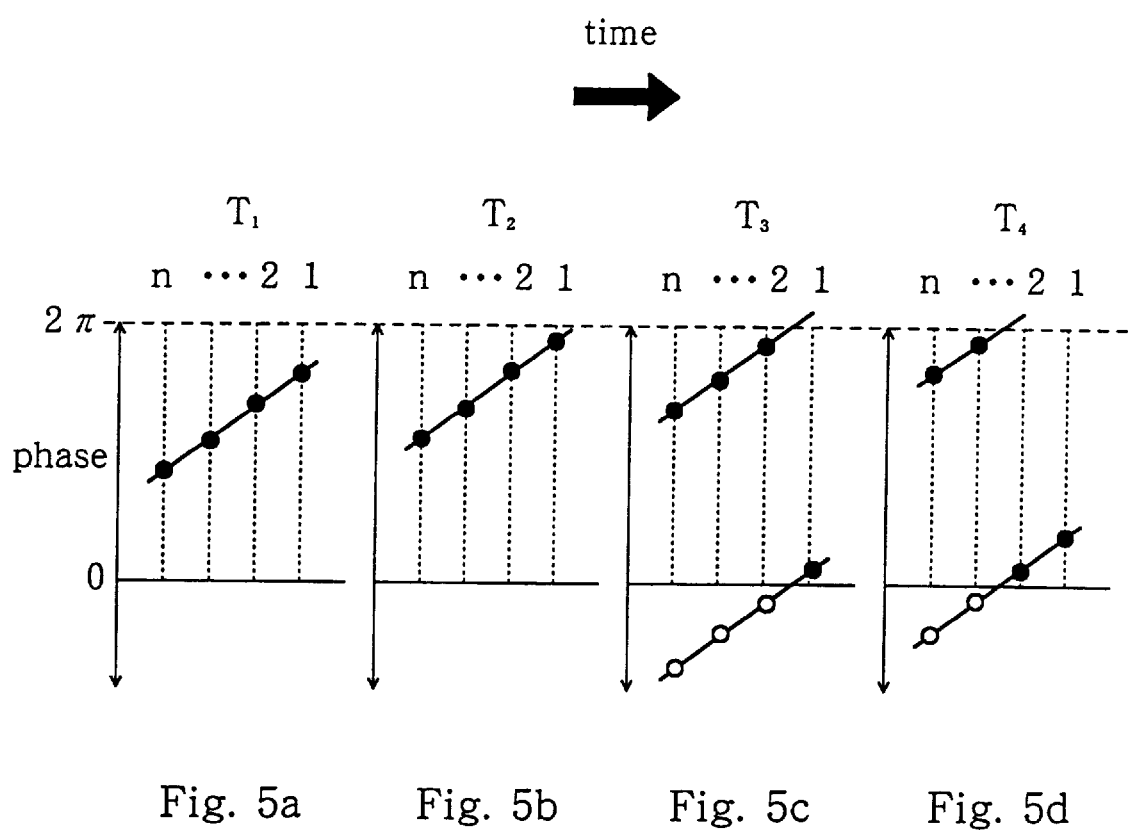
FIG. 5 is a diagram explaining the operation principle of the circuit shown in FIG. 3, in more detail.

In the example of phase discontinuity shown in FIGS. 5a and 5d, the signal phase is changed from $2\pi$ radian to 0 radian. In this case, the discontinuity detector 3 outputs $-2\pi$ radian to the adders 5-1 to 5-n, so that $-2\pi$ radian is added to the outputs of the most significant side shift registers 4-1 to 4-n. As a result, a sum of the output of the adder 5-k and the least significant side shift register 1-k becomes as shown by white circles in FIGS. 5c and 5d where k is an integer in a range from 1 to n, from which it is clear that the continuity of signal is obtained. Therefore, it is possible to obtain a correctly interpolated signal by performing an interpolation with using the signal whose discontinuity is removed.

Figure 6:
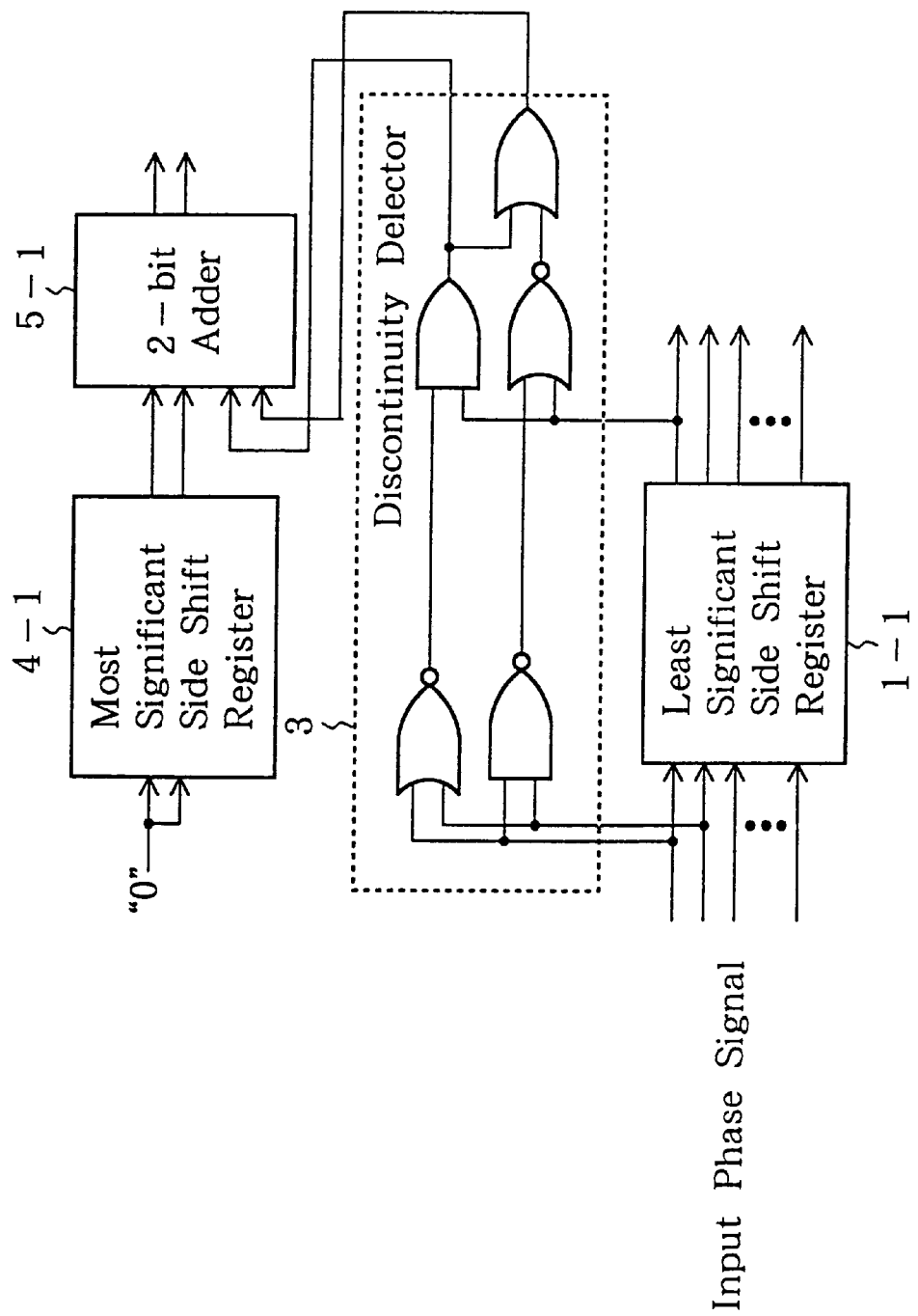
FIG. 6 is a circuit diagram of a least significant side shift register, a discontinuity detector, a most significant side shift register and an adder.

FIG. 6 shows a construction of an example of the discontinuity detector 3, the most significant and least significant side shift registers and the adders, in which only the most significant side shift register stage 1-1, only the least significant side shift register 4-1 and only the adder 5-1 which is a 2-bit adder are shown.

It is assumed in this circuit construction that the input phase signal is a train of digital data, so that a section of the input phase signal from 0 radian to $2\pi$ radian is represented by 000 . . . 0 to 111 . . . 1.

The discontinuity detector 3 receives the most significant 2 bits of the input phase signal and the most significant bit of the first least significant side shift register 1-1 and operates as follow:

A. the discontinuity detector 3 outputs "11" when the most significant 2 bits of the input phase signal are "0" and the most significant bit of the least significant side shift register 1-1 is "1".

B. the discontinuity detector 3 outputs "01" when the most significant 2 bits of the input phase signal are "1" and the most significant bit of the least significant side shift register 1-1 is "0".

The above condition A corresponds to the case where the input phase signal is changed in the direction $\pi \leq \theta < 2\pi \rightarrow 0 \leq \theta < \pi/2$ and the condition B corresponds to the case where the input phase signal is changed in the direction $0 \leq \theta < \pi \rightarrow 3\pi/2 \leq \theta < 2\pi$. Further, an output value of the discontinuity detector 3 is represented by two-bit compliment of 2 and "01" correspondsto $2\pi$ radian and "11" corresponds to $-2\pi$ radian.

The output of each of the most significant side shift registers 4-1 to 4-n is usually "00". However, when the phase discontinuity is detected, signals input to all of the shift registers and stored before the time of the phase discontinuity detection becomes "01" or "11".

As an example of the input data train, the followings will be considered:

110110=$(1+^{11}/_{16})\pi$
111010=$(1+^{13}/_{16})\pi$
111110=$(1+^{15}/_{16})\pi$
000010=$(^{1}/_{16})\pi$
000110=$(^{3}/_{16})\pi$

Figure 7:
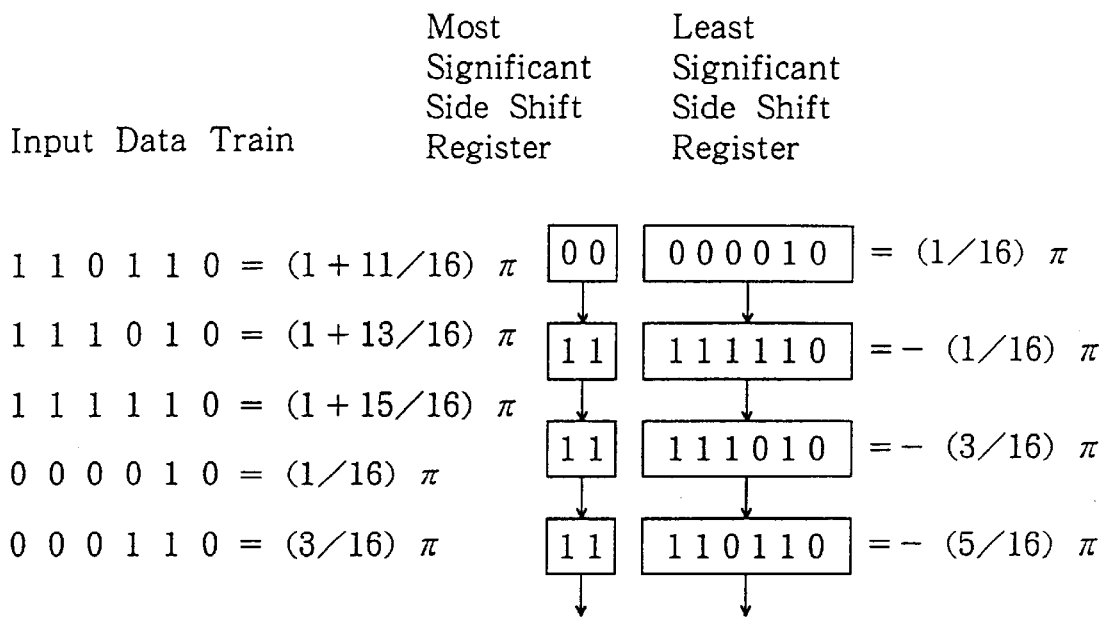
FIG. 7 is a diagram for explaining an operation of the circuit shown in FIG. 3.

The left side values are digital values and the right side values are phase values corresponding thereto, respectively. A discontinuity exists at the fourth input signal. A right side portion of FIG. 7 shows input data values of the most significant side and least significant side shift registers at the time when the fourth signal is input. Since the discontinuity detector 3 outputs "11" at the time when the fourth input data train "000010" is input, the values of the most significant side shift register stages except the first stage thereof becomes "11" as shown in a leftmost portion of the right side portion of FIG. 7. A rightmost portion of the right side portion of FIG. 7 shows phase values which are compliments of 2 of the most significant side values in the leftmost portion of the right side portion of the FIG. 7 connected to the least significant side values in a middle portion of the right side portion of FIG. 7. From this, it is clear that continuous signal trains whose discontinuity is removed are obtained.

Figure 8:
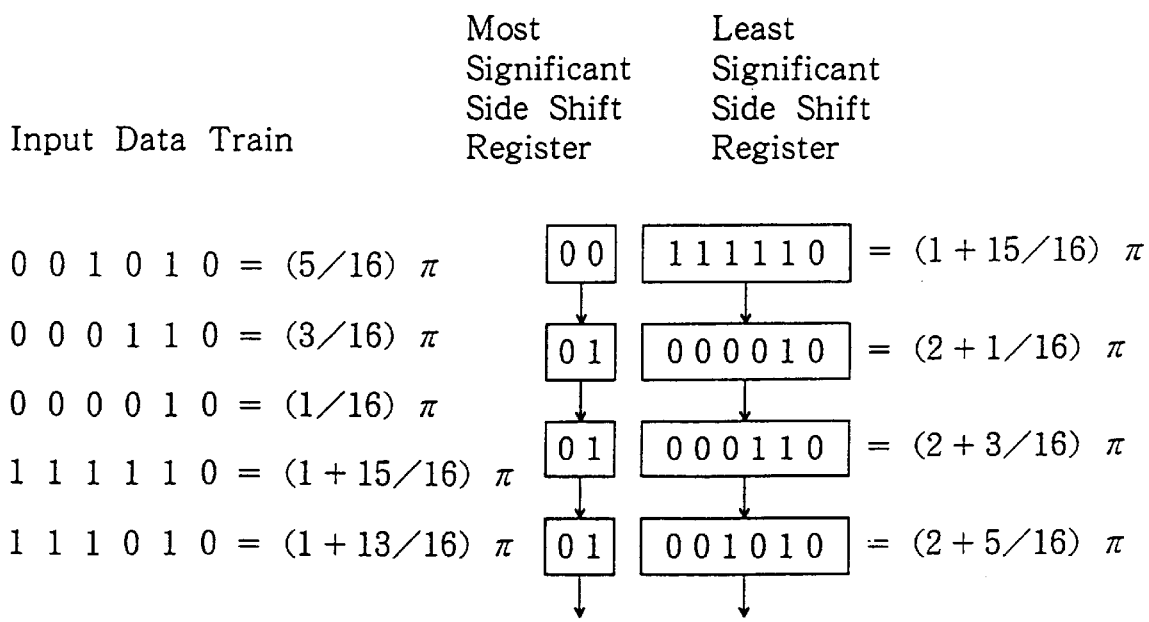
FIG. 8 is a diagram for explaining an operation of the circuit shown in FIG. 3.

FIG. 8 is similar to FIG. 7 except that the input data trains are input in reverse sequence. From FIG. 8, it is also clear that the discontinuous input data is converted into a continuous signal trains.

As described, according to the present invention in which the continuity of an input signal is maintained by detecting a discontinuity of an input signal and adding an offset value to data stored prior to the detection of the discontinuity, it is possible, even when an input signal representing a phase information is changed discontinuously, to detect the discontinuity of the input signal and correctly interpolate data.

What is claimed is:

1. A discontinuous signal interpolation circuit comprising:

a plurality (n) of first shift register stages input with an input signal having a definite presentation range, for storing n clock portions of the input signal, where n is an integer larger than 1;

a discontinuity detector input with the input signal and an output of a first shift register stage of said n first shift register stages for detecting a discontinuity between the input signal and the output of said first shift register stage of said n first shift registers and generating a signal indicative of "positive" when the discontinuity is in a direction from a minimum value to a maximum value of the presentation range and a signal indicative of "negative" when the discontinuity is in a direction from the maximum value to the minimum value;

a plurality (n) of second shift register stages input with zero;

a plurality (n) of adders having input terminals connected to outputs of said second shift register stages, respectively, a first to a (n-1)-th adders of the plurality of said adders having output terminals connected to input terminals of a second to an n-th second shift register stages of the plurality of said second shift registers, respectively, and each of said first to said n-th adders being adapted to add a difference between the maximum value and the minimum values of the presentation range of the input signal to the outputs of said n second shift register stages when an output of said discontinuity detector is a signal indicative of "positive", for subtracting the difference between the maximum value and the minimum values of the presentation range from the outputs of said n second shift register stages when an output of said discontinuity detector is a signal indicative of "negative", and supplying a result of the arithmetic operations to said second to said n-th second shift registers, respectively; and an interpolation circuit for adding an output of a k-th first shift register stage of the plurality of said first shift register stages and an output of a k-th adder of the plurality of said adders and interpolating resultant n signals, where k=1, 2, ..., n.

2. A discontinuous signal interpolation circuit as claimed in claim 1, wherein the input signal having the definite presentation range is represented as a digital signal train having a minimum value with all of its bits being 0 and a maximum value with all of its bits being 1, wherein said discontinuity detector judges a discontinuity with using a reference in which the most significant 2 bits of the input signal are "00" and the most significant bit of an output of a first one of the plurality of said first shift register stages is "1" or in which the most significant 2 bits of the input signal are "11" and the most significant bit of an output of a first one of the plurality of said first shift register stages is "0", wherein inputs/outputs of the plurality of said second shift register stages are 2-bit digital signals, respectively, and wherein a difference between the maximum value and the minimum value of the presentation range, which are added/subtracted by said adders, is "01".

3. A discontinuous signal interpolation circuit as claimed in claim 2, wherein the input signal having the definite presentation range is a phase signal and the maximum value of he presentation range is $2\pi$ radian and the minimum value is 0 radian.

4. A discontinuous signal interpolation circuit as claimed in claim 1, wherein the input signal having the definite presentation range is a phase signal and the maximum value of the presentation range is $2\pi$ radian and the minimum value is 0 radian.

* * * * *